US010846874B2

(12) United States Patent
Zeng

(10) Patent No.: US 10,846,874 B2
(45) Date of Patent: Nov. 24, 2020

(54) METHOD AND APPARATUS FOR PROCESSING POINT CLOUD DATA AND STORAGE MEDIUM

(71) Applicant: TENCENT TECHNOLOGY (SHENZHEN) COMPANY LIMITED, Shenzhen (CN)

(72) Inventor: Chao Zeng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 168 days.

(21) Appl. No.: 16/258,276

(22) Filed: Jan. 25, 2019

(65) Prior Publication Data

US 2019/0156507 A1    May 23, 2019

Related U.S. Application Data

(63) Continuation of application No. PCT/CN2017/103923, filed on Sep. 28, 2017.

(30) Foreign Application Priority Data

Oct. 10, 2016    (CN) .......................... 2016 1 0885733

(51) Int. Cl.
*G06K 9/00* (2006.01)
*G06T 7/70* (2017.01)
(Continued)

(52) U.S. Cl.
CPC ................ *G06T 7/70* (2017.01); *G06F 16/23* (2019.01); *G06F 16/29* (2019.01); *G06K 9/00* (2013.01);
(Continued)

(58) Field of Classification Search
CPC ........... G06F 16/23; G06F 16/29; G06K 9/00; G06K 9/00201; G06K 9/00798;
(Continued)

(56) References Cited

U.S. PATENT DOCUMENTS 9,285,230 B1* 3/2016 Silver .................... G01S 17/931
2013/0202197 A1* 8/2013 Reeler ................ G06K 9/00201
382/154

(Continued)

FOREIGN PATENT DOCUMENTS

CN    104992467 A    10/2015
CN    105631459 A    6/2016
(Continued)

OTHER PUBLICATIONS

Written Opinion and International Search Report dated Jan. 9, 2018 in PCT/CN2017/103923 with concise English translation.
(Continued)

*Primary Examiner* — Xin Jia
(74) *Attorney, Agent, or Firm* — Oblon, McClelland, Maier & Neustadt, L.L.P.

(57) ABSTRACT

Aspects of the disclosure provide a method for processing point cloud data. A plurality of frames of the point cloud data collected from an environment surrounding a pathway are classified into categories based on distances between three-dimensional points of respective frames of the point cloud data and a reference plane of the respective frame of the point cloud data. The distances indicate heights of the three-dimensional points of the plurality of frames of the point cloud data. The frames of the point cloud data of a same one of the categories that matches a pathway object are merged. Candidate point cloud data of three-dimensional points having distances from the pathway that satisfy a predetermined condition is extracted from the merged
(Continued)

frames of the point cloud data. Point cloud data conforming to a feature of the pathway object is extracted from the candidate point cloud data.

20 Claims, 11 Drawing Sheets

(51) Int. Cl.
  *G06F 16/29* (2019.01)
  *G06F 16/23* (2019.01)
  *G06T 7/11* (2017.01)
(52) U.S. Cl.
  CPC ...... *G06T 7/11* (2017.01); *G06T 2207/10016* (2013.01); *G06T 2207/10028* (2013.01); *G06T 2207/30256* (2013.01); *G06T 2207/30261* (2013.01)
(58) Field of Classification Search
  CPC . G06T 2207/10016; G06T 2207/10028; G06T 2207/30256; G06T 2207/30261; G06T 7/11; G06T 7/70
  See application file for complete search history.

(56) References Cited

U.S. PATENT DOCUMENTS

| | | | | |
|---|---|---|---|---|
| 2014/0347484 | A1* | 11/2014 | Byun | G06K 9/0085 348/148 |
| 2015/0371432 | A1 | 12/2015 | Medioni et al. | |
| 2016/0154999 | A1* | 6/2016 | Fan | G06K 9/00201 382/103 |
| 2018/0058861 | A1* | 3/2018 | Doria | G01S 7/4808 |

FOREIGN PATENT DOCUMENTS

| | | |
|---|---|---|
| CN | 105701478 A | 6/2016 |
| CN | 106651752 A | 5/2017 |

OTHER PUBLICATIONS

Rui et al. "Automatic Montane Road Extraction from Airbonre LiDAR Data," Geomatics World Dec. 2015 vol. 22, No. 6, 6 pages.
Chinese Office Application dated Sep. 28, 2018 in Chinese Application No. 201610885733.7 with partial English translation.

* cited by examiner

US 10,846,874 B2

METHOD AND APPARATUS FOR PROCESSING POINT CLOUD DATA AND STORAGE MEDIUM

RELATED APPLICATION

This application is a continuation of International Application No. PCT/CN2017/103923, filed on Sep. 28, 2017, which claims priority to Chinese Patent Application No. 201610885733.7, entitled "Method, Apparatus, and Storage Medium for Processing Point Cloud Data" filed on Oct. 10, 2016. The entire disclosures of the prior applications are hereby incorporated by reference in their entirety.

FIELD OF THE TECHNOLOGY

The present disclosure relates to an electronic map technology.

BACKGROUND OF THE DISCLOSURE

As a typical application mode of artificial intelligence for the next technological age, automated driving technology attracts unprecedentedly high attention. However, lack of a high-precision map has become a bottleneck that restricts development of the automated driving technology.

A road facility such as a road guardrail may be one of the key components of a high-precision map. Accurately presenting the road facility in the high-precision map is a premise of implementing high-precision vehicle positioning and automated driving safety.

Currently, point cloud data of a road environment is collected and objectified to form a high-precision map of a road facility. Objectification refers to identifying a road facility represented by each three-dimensional point, for example, a road guardrail and a street lamp.

There is no effective solution to efficiently extracting the point cloud data corresponding to the road facility from the collected point cloud data, and accurately presenting a corresponding three-dimensional entity (or object) image in the high-precision map based on the point cloud data of the road facility.

SUMMARY

Aspects of the disclosure provide a method for processing point cloud data. A plurality of frames of the point cloud data collected from an environment surrounding a pathway are classified, by processing circuitry at an information processing apparatus, into categories based on distances between three-dimensional points of respective frames of the point cloud data and a reference plane of the respective frame of the point cloud data. The distances indicate heights of the three-dimensional points of the plurality of frames of the point cloud data. The frames of the point cloud data of a same one of the categories that matches a pathway object are merged by the processing circuitry at the information processing apparatus. Candidate point cloud data of three-dimensional points having distances from the pathway that satisfy a predetermined condition is extracted, by the processing circuitry at the information processing apparatus, from the merged frames of the point cloud data. Point cloud data conforming to a feature of the pathway object is extracted, by the processing circuitry at the information processing apparatus, from the candidate point cloud data.

Aspects of the disclosure provide an apparatus for processing point cloud data. The apparatus includes circuitry configured to classify a plurality of frames of the point cloud data collected from an environment surrounding a pathway into categories based on distances between three-dimensional points of respective frames of the point cloud data and a reference plane of the respective frame of the point cloud data. The distances indicating heights of the three-dimensional points of the plurality of frames of the point cloud data. The circuitry is further configured to merge the frames of the point cloud data of a same one of the categories that matches a pathway object, and extract, from the merged frames of the point cloud data, candidate point cloud data having three-dimensional points having distances from the pathway that satisfy a predetermined condition. The circuitry is further configured to extract, from the candidate point cloud data, point cloud data conforming to a feature of the pathway object.

Aspects of the disclosure provide a non-transitory computer-readable medium storing a program. The program is executable by a processor to perform the method for processing point cloud data.

DESCRIPTION OF EMBODIMENTS

Figure 1:
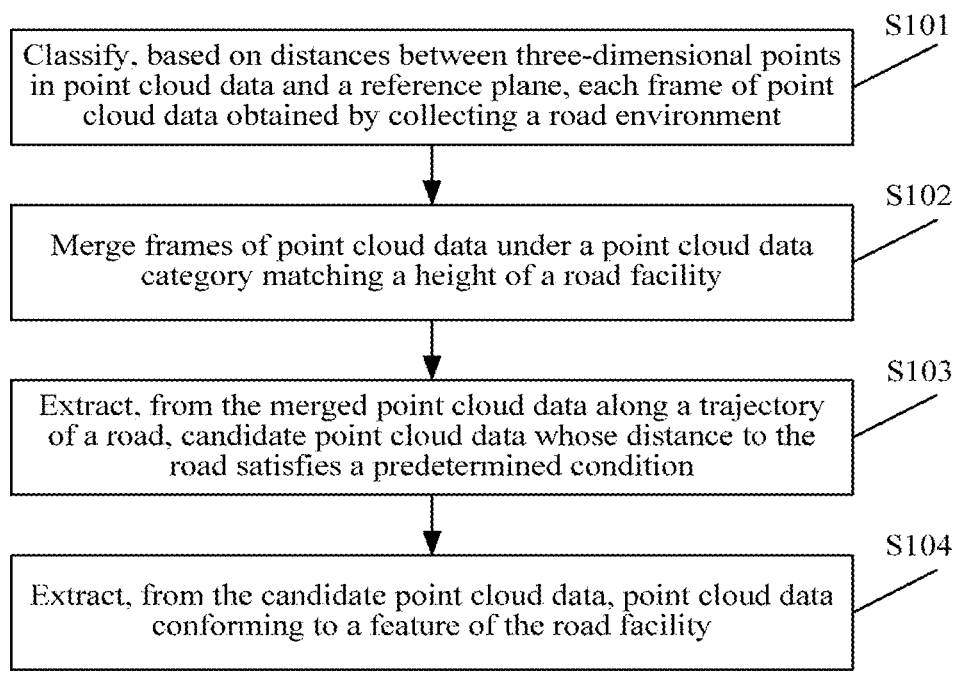
FIG. 1 is a schematic flow chart of a method for processing point cloud data according to an embodiment of the present disclosure.

The following describes the present disclosure in detail with reference to the accompanying drawings and embodiments. It should be understood that the specific embodiments described herein are merely used to explain but are not intended to limit the present disclosure.

1) In an embodiment, point cloud data refers to data obtained by a scanning device (for example, a laser scanner) that is mounted on a vehicle or another mobile apparatus (for example, an aircraft) and configured to scan a road environment, and recorded in a form of point. Each point can include coordinates of three-dimensional points, and may optionally/selectively include other attribute information for the corresponding three-dimensional points, for example, color information of red, green, and blue (RGB), and/or reflective intensity information. For example, the road environment can include various objects surrounding a road/pathway. The road/pathway can be a selected or predetermined, indoor or outdoor, paved or unpaved, route, pathway, highway, trail, bridge, tunnel, or the like. In some embodiments, the road can be a route that is on a surface of water (e.g., a river, a canal, a lake, a sea, etc.) or underwater, and travelled by a watercraft (e.g., ships, boats, hovercraft, submarines, and the like). In some embodiments, the road can be a route in the air or in outer space travelled by an aircraft or spaceship. In various embodiments, the road environment can include various road objects. For example, in some embodiments, the road environment includes road facilities (e.g., guardrails, traffic lights, monitoring cameras, and traffic signs, etc.). In some embodiments, the road environment includes geological/topological features. In some embodiments, the road environment can include anything that can be traversed by a scanning device (manned or unmanned) which needs to be mapped for subsequent use by a user. Point cloud data corresponding to the various road objects (e.g., road facilities or objects other than road facilities) in a road environment can be processed using the techniques disclosed herein.

2) In an embodiment, a high-precision or suitable map refers to a map capable of presenting lanes, and including information such as a lane line, a marking, and road parameters. In an embodiment, the high-precision map includes at least centimeter-level positioning precision, and may further include road facility information (for example, traffic facilities such as traffic lights, an electronic eye and a traffic sign). While a high-precision map as described above is used as an example in some embodiments, other types of maps can be derived using the techniques described herein for processing point cloud data. For example, a map derived by using the techniques described herein can be of any suitable precision other than high-precision. Thus, the techniques for processing point cloud data are not limited to the high-precision map.

In an embodiment, road parameters may be static traffic information (for example, whether traffic restriction or a speed limit is imposed), and/or dynamic traffic information such as a vehicle flow situation (whether traffic is unimpeded, or whether a traffic accident has occurred) and a road condition on a ground (whether waterlogging or icing exists).

3) In an embodiment, an object (or road object, pathway object) refers to one of various tangible objects (for example, a road facility, a plant, a building, etc.) surrounding a road. A road, as described above, can be a route on land, underground, on water, underwater, in the air, or in outer space. Corresponding to different types of roads, a road object can be any tangible object surrounding a road. For example, a road object can be one type of road facilities in some embodiments. A road object can be geological/topological features surrounding a road that are man-made or naturally-formed, such as plants, road-side obstacles, buildings, in some other embodiments. A road object can refer to anything that can be traversed by a scanning device (manned or unmanned) which needs to be mapped for subsequent use by a user.

4) In an embodiment, object point cloud data refers to some point cloud data that is used for representing an object.

5) In an embodiment, ground point cloud data refers some point cloud data that is used for representing a ground (for example, a pavement, the earth's surface connected to a road, a water surface, or a plane that can be used as a reference for implementing the techniques described herein).

6) In an embodiment, road or target facilities refer to auxiliary facilities that are around a road and that are distributed along the road, for example, road guardrails, traffic signs, traffic lights, and electronic eyes. As described, the road can be a route on land, underground, on water, underwater, in the air, or in outer space. Accordingly, the road facilities can by any suitable facilities that are near or over the road and are useful for transportation via the road.

7) In an embodiment, road guardrails refer to rigid or semi-rigid, and for example, are of a structure supported by a primary column (further including a structure of ripping fences stitched with each other), and are continuously disposed along two sides of a road. When a road guardrail is collided by a vehicle, because of good collision resistance performance and a function of absorbing energy, the road guardrail prevents the vehicle from veering off the road or into dangerous road conditions which protects the vehicle, and its driver and passenger(s). In various embodiments, the road guardrails may have various structures. For example, a guardrail may be in a form of a fence or wall constructed by various materials. As a road can be a route on land, underground, in the air, on water or underwater, the guardrail may accordingly take different forms and be made of different materials. For example, in addition to serve the purpose for transportation safety, a guardrail may be used for purposes of guiding a vehicle or constraining a vehicle over a route.

8) In an embodiment, three-dimensional curve fitting refers to using a continuous curve to approximately depict or an analogical curve to fit three-dimensional points in point cloud data, to make three-dimensional points as many as possible conform to distribution of a continuous three-dimensional curve, for example, located on the continuous three-dimensional curve or relatively near the three-dimensional curve, and the three-dimensional curve is a result of performing three-dimensional curve fitting based on the point cloud data.

The embodiments of the present disclosure provide a method for processing point cloud data. A schematic flow chart of the method is shown in FIG. 1. The method can include the following steps: step S101: Classify, based on distances between three-dimensional points in point cloud data and a reference plane, each frame of point cloud data collected from a road environment; step S102: Merge frames of point cloud data under a point cloud data category matching a height of a road facility; step S103: Extract, from the merged point cloud data along a trajectory of a road, candidate point cloud data having a distance to the road in the horizontal direction satisfies a predetermined condition; and step S104: Extract, from the candidate point cloud data, point cloud data conforming to a feature of the road facility. It is noted that while processing of point cloud data of road facilities are described in some embodiments, the point cloud data processing techniques described herein are not limited to road facilities. The point cloud data processing techniques can be similarly applied to extract point cloud data of road objects other than road facilities in order to derive a digital map for subsequent use by a user. For example, the road objects can include geological/topological features surrounding a road that are man-made or naturally-formed, such as plants, road-side obstacles, buildings, in some other embodiments.

An embodiment of the present disclosure provides an apparatus configured to implement the foregoing method for processing point cloud data. The apparatus may be implemented in different ways. Examples of the apparatus are described below.

Figure 3A:
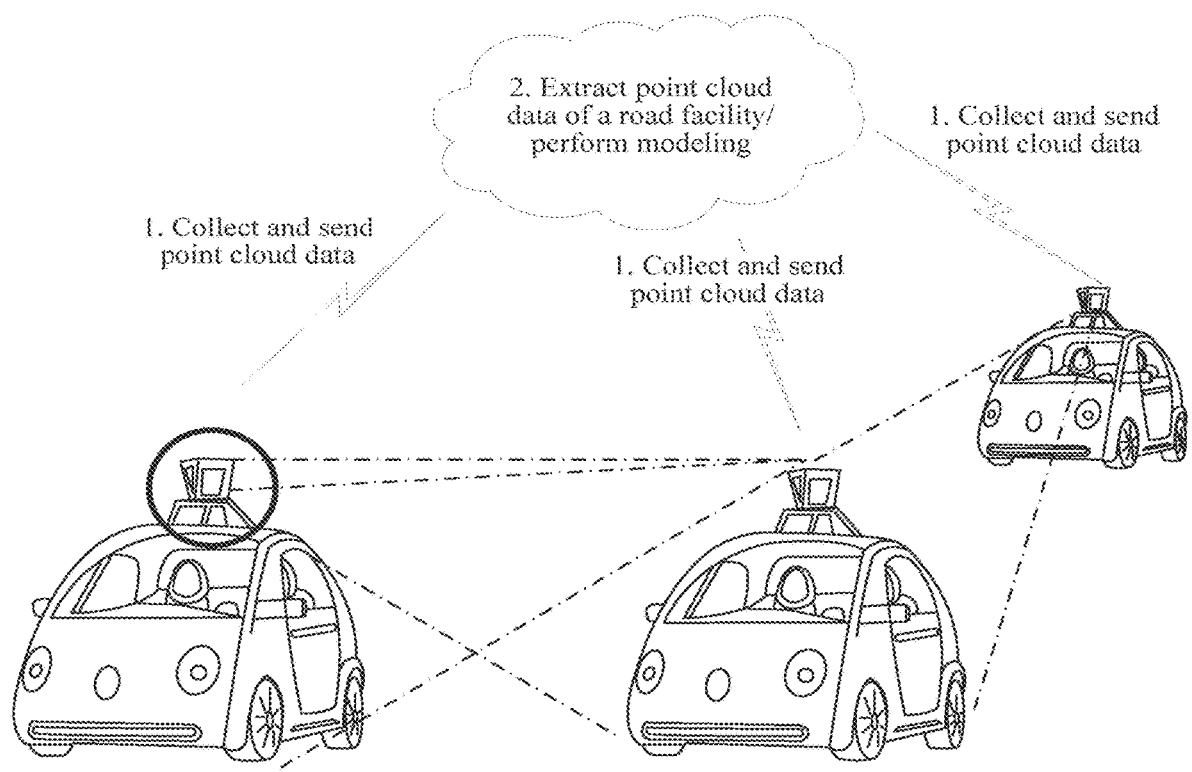
FIG. 3A is a schematic diagram of a scenario of point cloud data processing that is distributed on a vehicle side and cloud according to an embodiment of the present disclosure.

1) In an embodiment, the apparatus for processing point cloud data is distributively implemented on a vehicle side and cloud server side as shown in FIG. 3A example.

Figure 2:
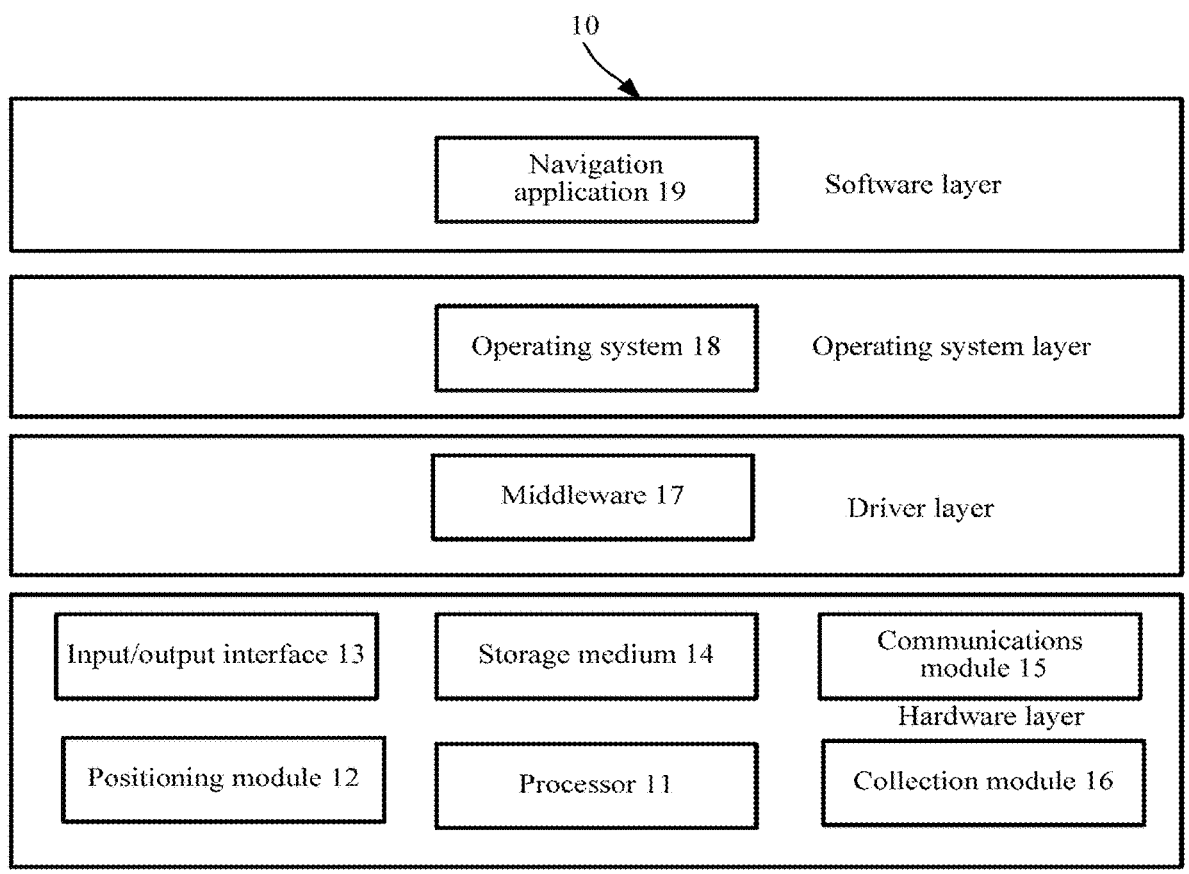
FIG. 2 is a schematic structural diagram of an apparatus including software and hardware for processing point cloud data according to an embodiment of the present disclosure.

Referring to a schematic structural diagram of an apparatus 10 for processing point cloud data shown in FIG. 2, the apparatus 10 for processing point cloud data includes a hardware layer, a driver layer, an operating system layer, and a software layer. However, a person skilled in the art should understand that a structure of the apparatus 10 for processing point cloud data shown in FIG. 2 is only an example, and is not intended to limit a structure of the apparatus 10 for processing point cloud data. For example, for the apparatus 10 for processing point cloud data, more components than FIG. 2 may be disposed based on an implementation requirement, or some components may be omitted to not be disposed based on an implementation requirement.

In an embodiment, the hardware layer of the apparatus 10 for processing point cloud data includes processing circuitry such as a processor 11, an input/output interface 13, a storage medium 14, a positioning module 12, a communications module 15, and a collection module 16, and each component may be connected by using a system bus to communicate with the processor 11.

In an embodiment, the processor 11 may be implemented by using a central processing unit (CPU), a Microcontroller Unit (MCU), an application specific integrated circuit (ASIC), or a Field-Programmable Gate Array (FPGA).

In an embodiment, the input/output interface 13 may be implemented by using an input/output device such as a screen, a touch panel, or a loudspeaker.

In an embodiment, the storage medium 14 may be implemented by using a non-volatile storage medium such as a flash memory, a hard disk, or an optical disc, or may be implemented by using a volatile storage medium such as a Double Data Rate (DDR, Double Data Rate) dynamic cache.

The storage medium 14 stores an executable instruction used for performing the foregoing method for processing point cloud data.

In an embodiment, the storage medium 14 may be intensively disposed, or may be distributively implemented at different positions.

In an embodiment, the communications module 15 provides the processor 11 with external data such as an access ability of the storage medium 14 that is disposed in a different area. Exemplarily, the communications module 15 may implement short-distance communications performed based on a near field communication (NFC) technology, a Bluetooth technology, and a ZigBee technology, or may implement, for example, communications based on a communications standard such as code division multiple access (CDMA) and wideband code division multiple access (WCDMA) and an evolution standard thereof.

In an embodiment, the collection module 16 is configured to collect and output point cloud data from a plurality of angles, and may be implemented by using a laser scanner or a three-dimensional camera. The point cloud data includes at least coordinates of three-dimensional points. Based on a specific type of the collection module 16, the point cloud data further includes related attribute information. For example, when the collection module 16 is a depth camera, the attribute information is RGB information. For another example, when the collection module 16 is a laser scanner, the attribute information is reflective intensity information (related to grayscale) of the three-dimensional points.

In an embodiment, the driver layer includes a middleware 17 that is for an operating system 18 to identify the hardware layer and that communicates with each component of the hardware layer. For example, the middleware 17 may be a set of drivers of components of the hardware layer.

In an embodiment, the software layer includes providing a user with an application based on a high-precision map, for example, a navigation application 19, and may encapsulate various services based on the high-precision map as an application programming interface (API) that may be invoked.

For example, when the communications module 15 establishes communicates with a vehicle terminal in a vehicle, the software layer may provide an application in the vehicle terminal with services based on the high-precision map, including positioning a current position of the vehicle, and a navigation routing query.

A diagram of a typical implementation scenario where an apparatus for processing point cloud data is distributively implemented on a vehicle side and a cloud server side is shown in FIG. 3A. The foregoing collection module (for example, a laser scanner) is disposed on the vehicle side for collecting point cloud data from a road environment from a plurality of angles (e.g. 0 to) 360° as the vehicle travels, to form point cloud data at different positions, and a label of a collection angle may be added to the collected point cloud data.

In another embodiment, the foregoing positioning module can be deployed on the vehicle side, and may determine a real-time position of the vehicle based on a global positioning system (GPS), a BeiDou satellite positioning navigation system, and so on (for example, record by using coordinates in various forms). A label of a collected geographic position can be added to the collected point cloud data, and sent to a server or processing device (which may be cloud or network based or deployed at a remote location) by using a communications module deployed on the vehicle side. Point cloud data of a road facility is extracted (by executing the executable instruction in the storage medium) from the point cloud data by a processor disposed on the cloud-based server, and three-dimensional modeling is performed on the road facility by using the point cloud data of the road facility, to form a three-dimensional entity image of the road facility that may be configured to be presented in a high-precision or suitable map.

Figure 3B:
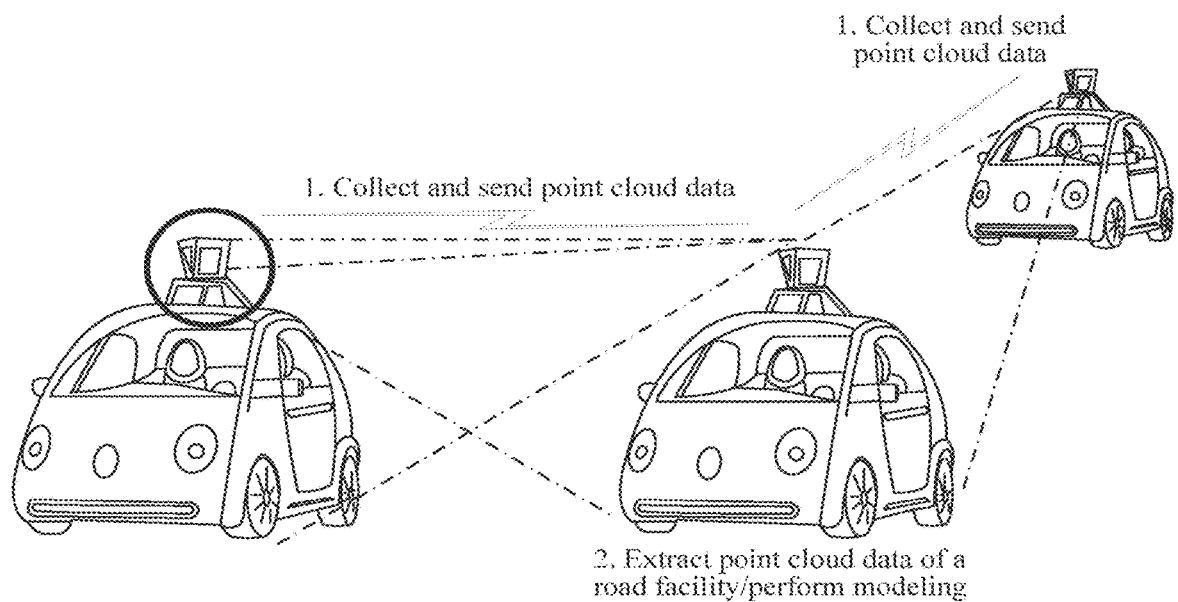
FIG. 3B is a schematic diagram of a scenario of point cloud data processing that is distributed on a vehicle side according to an embodiment of the present disclosure.

2) In an embodiment, the apparatus for processing point cloud data is distributively implemented on a vehicle side as shown in FIG. 3B example.

For a schematic structural diagram of software and hardware of an apparatus for processing point cloud data, reference may still be made to FIG. 2, and a diagram of a typical implementation scenario where an apparatus for processing point cloud data is distributively implemented on a vehicle side is shown in FIG. 3B. During traveling of a vehicle, the collection module (for example, a laser scanner) is disposed on the vehicle side and collects point cloud data from a road environment from a plurality of angles (e.g. 0 to 360°) (e.g., every 45°, 60°, or 90°) as the vehicle travels, to form point cloud data at different positions. A label of a collection angle may be added to the collected point cloud data.

In an embodiment, the positioning module may be deployed on the vehicle side, and may determine a real-time position of the vehicle based on a global positioning system (GPS), a BeiDou satellite positioning navigation system, and so on (for example, record by using coordinates in various forms). A label of a geographic position can be added to the collected point cloud data. Point cloud data of a road facility is extracted from the point cloud data by a controller disposed on the vehicle side, and three-dimensional modeling is performed on the road facility by using the point cloud data of the road facility, to form a road facility that may be configured to be presented in a high-precision or suitable map. The extracted point cloud data of the road facility can be sent to a cloud-based server or network based server. In an embodiment, the server provides a service based on a high-precision or suitable map having the detected/collected road facility data or representation thereof (graphical or otherwise).

In an embodiment, an apparatus for processing point cloud data may be implemented on a vehicle and/or a cloud server. The following describes an embodiment of the present disclosure with reference to a scenario of point cloud data processing as shown in FIG. 3A.

Figure 4A:
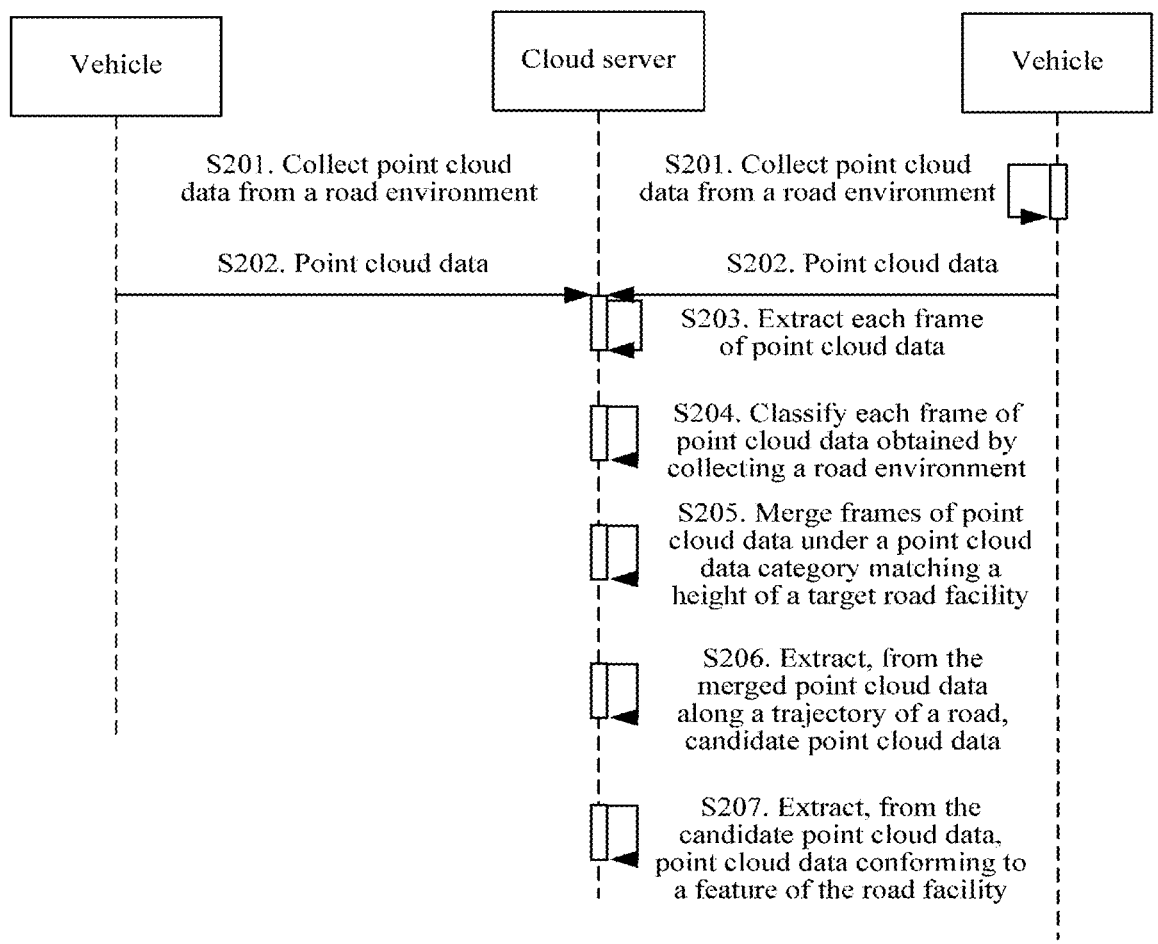
FIG. 4A is a schematic flow chart of a method for processing point cloud data according to an embodiment of the present disclosure.

FIG. 4A shows a schematic flow chart of an exemplary method for processing point cloud. The method includes the following steps:

Step S201: When a vehicle travels along a road/path/route, point cloud data of a road/path/route environment is collected.

As described above, the collection module (for example, a laser scanner, or a three-dimensional camera) is disposed in the vehicle to collect point cloud data from a road environment. Positions of the vehicle are tracked in real time at a pre-determined interval using the positioning module. Data of the environment is collected from a plurality of angles (for example, from full angles of 0 to 360°) by using the collection module. An example data structure of point cloud data collected from any angle at each position may include: a geographic position, a collection angle, coordinates of three-dimensional points, and attribute information of the three-dimensional points.

Step S202: A vehicle sends the point cloud data collected along the road to a cloud-based server (or a cloud server).

In an embodiment, each vehicle may send, by using a communications module provided thereon, the point cloud data collected by the collection module to the cloud-based server, for example, in real time. The cloud-based server can have a high or sufficient operational capability to extract point cloud data corresponding to a road facility from the point cloud data as soon as possible or within a predetermined timeframe or period of time. In an embodiment, this is applicable to an application scenario of updating a high-precision or suitable digital or electronic map or mapping data in real time.

In another embodiment, each vehicle may send, when a predetermined sending condition is reached, the point cloud data collected by the collection module to the cloud-based server, for the cloud-based server to extract point cloud data corresponding to a road facility from the received point cloud data. In an embodiment, this is applicable to an application scenario of updating a high-precision or suitable digital or electronic map or mapping data under a predetermine/predefined time condition or intervals.

In an embodiment, when a predetermined time (which may be periodic, or may be nonperiodic) is reached, point cloud data collected in a predetermined time period is sent to a server (such as a cloud or networked based server). For example, collected point cloud data may be sent, for example, every five, ten, or sixty minutes.

In an embodiment, when the distance of travel or traversal of a vehicle satisfies or reaches a predetermined distance, point cloud data collected in a predetermined distance may be sent, such as by the vehicle, to a server. For example, when the vehicle travels one kilometer, point cloud data collected in one kilometer (or in any predetermined distance up to one kilometer) is sent to a server (such as a cloud or networked based server).

Step S203: The server extracts each frame of point cloud data according to a requirement and based on angle information of each point.

The point cloud data received by the server is discrete point cloud data collected at different positions and from different collection angles. Herein, the server integrates the received point cloud data in a form of a frame to facilitate subsequent processing. Each collection position corresponds to at least one frame of point cloud data. The number of frames of point cloud data formed at a position depends on duration of stay at the position and a speed of scanning the road environment during collection.

The server receives point cloud data collected from different angles (e.g. 0 to 360°) of different positions. In an embodiment, for the received point cloud data, collection positions are distinguished based on labels of geographic positions of the point cloud data. For point cloud data corresponding to a collection position, the point cloud data from different collection angles of the corresponding position forms one frame of point cloud data of the corresponding position. The frame of point cloud data includes coordinates of the position and attribute information of three-dimensional points obtained from different angles at the corresponding position.

It is assumed that one frame of point cloud data at position 1 is formed. First, point cloud data having a label of the position 1 is extracted from the received point cloud data. Then, for the point cloud data having a label of the position 1, one corresponding frame of point cloud data is formed by ordering, based on a sequence of collection angles, of the point cloud data.

For example, a data structure of one frame of point cloud data at the position 1 is (the position 1, a collection angle 0—a coordinate of a three-dimensional point 1—attribute information of the three-dimensional point 1; . . . ; a collection angle 0—a coordinate of a three-dimensional point n—attribute information of the three-dimensional point n; . . . ; a collection angle 360—the coordinate of the three-dimensional point 1—the attribute information of the three-dimensional point 1; . . . ; the collection angle 360—the coordinate of the three-dimensional point n—the attribute information of the three-dimensional point n).

Step S204: The server classifies, based on distances between three-dimensional points and a reference plane in each frame of point cloud data, each frame of point cloud data collected from a road environment.

In an embodiment, the reference plane may be a horizontal plane or another reference plane. A plane equation of a corresponding horizontal plane is established based on coordinates of three-dimensional points of each frame of point cloud data. A height or distance of each three-dimensional point in the frame of the point cloud data relative to the horizontal plane are obtained based on the plane equation. Based on the height/distance of each three-dimensional point, and a value range of heights/distances corresponding to a ground and an object, each frame of point cloud data is defined (or classified) as at least point cloud data corresponding to the ground (ground point cloud data) and point cloud data corresponding to the object (object point cloud data). Certainly, each frame of point cloud data may also be defined (classified) as point cloud data that is of another type and that is higher than a height/distance of the object (another point cloud data for short).

For example, there is a difference between heights of a road facility on a horizontal plane and another object such as a plant. In an embodiment, a height of a traffic light may be at least one meter, a height of a road guardrail may be between 0.3 meters to 1 meter, and a plant near or adjacent a road, for example, a flower and plant may be less than 0.3 meters.

Accordingly, in an embodiment, by using a height of a three-dimensional point in each frame of point cloud data relative to a horizontal plane, the three-dimensional point may be preliminarily determined to correspond to the horizontal plane, correspond to the object or correspond to a higher object. The three-dimensional point can thus be divided into point cloud data of a corresponding category. For different road facilities, a point cloud data category matching a height of a road facility is also different. Example situations include:

Situation 1): For a road guardrail, a height thereof is within a value range of the height of a guardrail. Therefore, it is obtained through classification that the point cloud data including the road guardrail matches a height of the road guardrail.

Situation 2): For traffic lights, a height thereof is beyond a height range of a guardrail. Therefore it is obtained through classification that another point cloud data including the traffic lights matches a height of the traffic lights.

As can be seen, after each frame of point cloud data is classified, processing may be subsequently performed on only the point cloud data category matching the height of the road facility or desired object, and another point cloud data category is screened out (no subsequent processing is needed). This leads to an effect of preliminarily screening point cloud data including a road facility or desired object, and reduces a data volume in subsequent processing.

Step S205: Merge point cloud data of frames in a point cloud data category matching a height of a road facility.

In an embodiment, when the target road facility is a road guardrail, respective object point cloud data corresponding to a respective category of the guardrail from of a plurality of frames is merged; and when the target road facility is traffic lights, point cloud data corresponding to a respective category of the traffic lights from data plurality of frames is merged.

In an embodiment, a method of stitching point cloud data based on a feature is provided for merging of point cloud data. In the following example, when the road facility is a road guardrail, object point cloud data corresponding to a category of the guardrail obtained from a plurality of frames is merged. For example, features are extracted from coordinates and attribute information of three-dimensional points of the object point cloud data of a respective frame. A similar feature is identified by comparing respective frames of point cloud data. Point cloud data from each frame is stitched based on the identified feature. While in some examples of this disclosure, point cloud data processing is described with the usage of "each frame", it is noted that embodiments described in this disclosure are not limited to the usage of "each frame". Any embodiment described herein is readily applicable to scenarios where a subset of the frames under discussion is processed.

In an embodiment, object point cloud data of respective frames is analyzed to obtain a partial feature of an object represented by the object point cloud data of the respective frame. The partial feature can be a set of points that are on the object and that are irrelevant to a size and rotation of an image of the object. For example, the set of points may be imaging points of any part of any object, including a point at an edge of the object, or may be a point that is on the object and that is inconsistent with a feature of the object, for example, a black spot on a white object, a salient spot on an object, a concave spot on an object, a rust spot on a metal object, and a peeling spot on surface paint of an object.

It is assumed that N (greater than 2) frames of object point cloud data exist. As shown in FIG. 4D, merging object point cloud data of a first frame and a second frame is used as an example. The object point cloud data in the first and second frame is analyzed to detect a set of feature points (a feature point set) for each respective frame. The feature points may be described by using feature vectors. Feature points in a feature point set 1 and feature points in a feature point set 2 are matched to obtain a same feature point set, denoted as feature points 1. A shape s1 of the feature points 1 in the first frame of the point cloud data and a shape s2 of the feature points 1 in the second frame of the point cloud data have the following relationship: s1=s2*f, where f represents an adjustment of a size and rotation in an angle. In this way, a coordinate system of three-dimensional points in the second frame of the point cloud data may be converted to a coordinate system of three-dimensional points in the first frame of the point cloud data by conversion of f, thereby realizing stitching of the first frame of the object point cloud data and the second frame of the object point cloud data.

It may be understood that when the road facility is traffic lights, processing of merging another category of point cloud data obtained from categories of a plurality of frames is similar to that of the foregoing merging of guardrails, and details are not described again.

In another embodiment, a method of merging based on a three-dimensional conversion relationship between point sets of three-dimensional points in frames of point cloud data is provided for merging of point cloud data. A three-dimensional conversion relationship of a point set of same three-dimensional points between three-dimensional points in frames of point cloud data is identified, and the corresponding frames of point cloud data are stitched based on the three-dimensional conversion relationship.

Still using the merging of object point cloud data of a first frame and a second frame as an example, a point set (the point set is set to be PL) including n three-dimensional points exists in the first frame of the object point cloud data, and a point set (the point set is set to be PR) including n three-dimensional points exists in the second frame of the object point cloud data. It is calculated by using a point cloud registration algorithm that each point in the point set PL is in one-to-one correspondence to three-dimension points in the point set PR after three-dimensional space conversion. In an embodiment, a number of points in the point set PR and the point set PL are maximized by using an iterative method. As a result, a three-dimensional conversion relationship that can accurately represent the point set PR and the point set PL can be obtained. The three-dimensional conversion relationship is represented as f.

In this way, a coordinate system of three-dimensional points in the second frame of the point cloud data may be converted to a coordinate system of three-dimensional points in the first frame of the point cloud data by conversion of f, thereby realizing stitching of the first frame of the object point cloud data and the second frame of the object point cloud data.

Step S206: The server extracts, from the merged point cloud data and along a trajectory of a road, candidate point cloud data having a distance to the road satisfying a predetermined condition.

In an embodiment, because the point cloud data carries labels of a geographic positions along the path, the labels of the geographic positions are extracted from respective frames of point cloud data to obtain a trajectory of the road described in a form of adjacent geographic positions (for example, a geographic position 1—a geographic position 2—a geographic position 3). In an embodiment, for the point cloud data merged in step S205, at least one of the following types of three-dimensional points may be identified along the trajectory of the road and from the merged point cloud data, and point cloud data corresponding to the identified three-dimensional points is acquired as candidate point cloud data:

1) three-dimensional points most close to a corresponding geographic position in the trajectory of the road, namely, three-dimensional points whose distances to the road are less than a first distance threshold.

2) three-dimensional points (also referred to as neighborhood points) whose distances to the three-dimensional points (the three-dimensional points most close to the road) are less than a second distance threshold (which may be the same as or different from the foregoing first distance threshold).

For example, when the road facility is a road guardrail, the trajectory of the road is set to include N adjacent geographic positions. Three-dimensional points whose distances to a position n (1≤n≤N) are not beyond two meters and neighborhood points whose distances to the foregoing three-dimensional points are not beyond 0.5 meters are extracted in sequence from the merged point cloud data. Point cloud data corresponding to the extracted three-dimensional points and neighborhood points is candidate point cloud data of the road guardrail.

For another example, when the road facility is a road guardrail, the trajectory of the road is set to include N adjacent geographic positions. Three-dimensional points whose distances to a position n (1≤n≤N) are not beyond one meter and neighborhood points whose distances to the foregoing three-dimensional points are not beyond 0.25 meters are extracted in sequence from the merged point cloud data. Point cloud data corresponding to the extracted three-dimensional points and neighborhood points is candidate point cloud data of the road guardrail.

Road facilities are usually distributed along a trajectory of a road. Therefore, extracting point cloud data along the trajectory of the road further screens out the point cloud data, and reduces a data volume in subsequent processing; and because the point cloud data is screened out based on whether a distance to the road satisfies a predetermined condition, extracting point cloud data along the trajectory of the road conforms to a distribution feature of the road facilities, and a case of incorrect deletion does not occur or is minimized such as to an acceptable level.

Step S207: Extract, from the candidate point cloud data, point cloud data conforming to a feature of the road facility.

Exemplary method #1 of extracting point cloud data of a road facility:

In an embodiment, in view of that road facilities such as road guardrails, and traffic lights have a whole/general distribution feature of being uniformly disposed along a trajectory of a road and of certain consistent heights, correspondingly, a method of extracting point cloud data of a road facility is provided below. Point cloud data satisfying the following conditions is identified from the candidate point cloud data as the point cloud data of the road facility:

1) Three-dimensional points are distributed along the trajectory of the road, and vertical distances to the road (in a horizontal plane) are not beyond a distance threshold.

2) Rectilinear projection distances (also referred to an elevation) of three-dimensional points relative to a reference plane conform to a uniform feature. In other words, heights of the three-dimensional points with respect to the road are uniform.

After identification is completed, the point cloud data corresponding to the identified three-dimensional points is extracted from the candidate point cloud data, as point cloud data conforming to a feature of the road facility, namely, the point cloud data of the road facility.

For example, for the candidate point cloud data of the road guardrail, three-dimensional points having vertical distances to the road not beyond one meter, and having a height of 0.3 meters (a vertical range is not beyond 0.1 meter) are identified from the candidate point cloud data of the road guardrail, and point cloud data of the identified three-dimensional points is point cloud data of the road guardrail.

For another example, for candidate point cloud data of traffic lights, three-dimensional points whose vertical distances to the road are not beyond two meters, and having a height of 3 meters (a vertical range is not beyond 0.5 meters) are identified from the candidate point cloud data of the traffic lights, and point cloud data of the identified three-dimensional points is point cloud data of the traffic lights.

Exemplary method #2 of extracting point cloud data of a road facility:

In another embodiment, based on a partial/local spatial distribution feature of point cloud data of a road facility, point cloud data conforming to a feature of the road facility is extracted from the candidate point cloud data. In such a method of extracting the point cloud data of the road facility, clustering processing on three-dimensional points in the candidate point cloud data is performed to form a plurality of candidate point cloud data sets. Respective candidate point cloud data set includes a plurality of three-dimensional points and attribute information. Based on a spatial distribution feature of each segmented candidate point cloud data set, it is determined whether the candidate point cloud data set belongs to the point cloud data of the road facility.

Figure 4B:
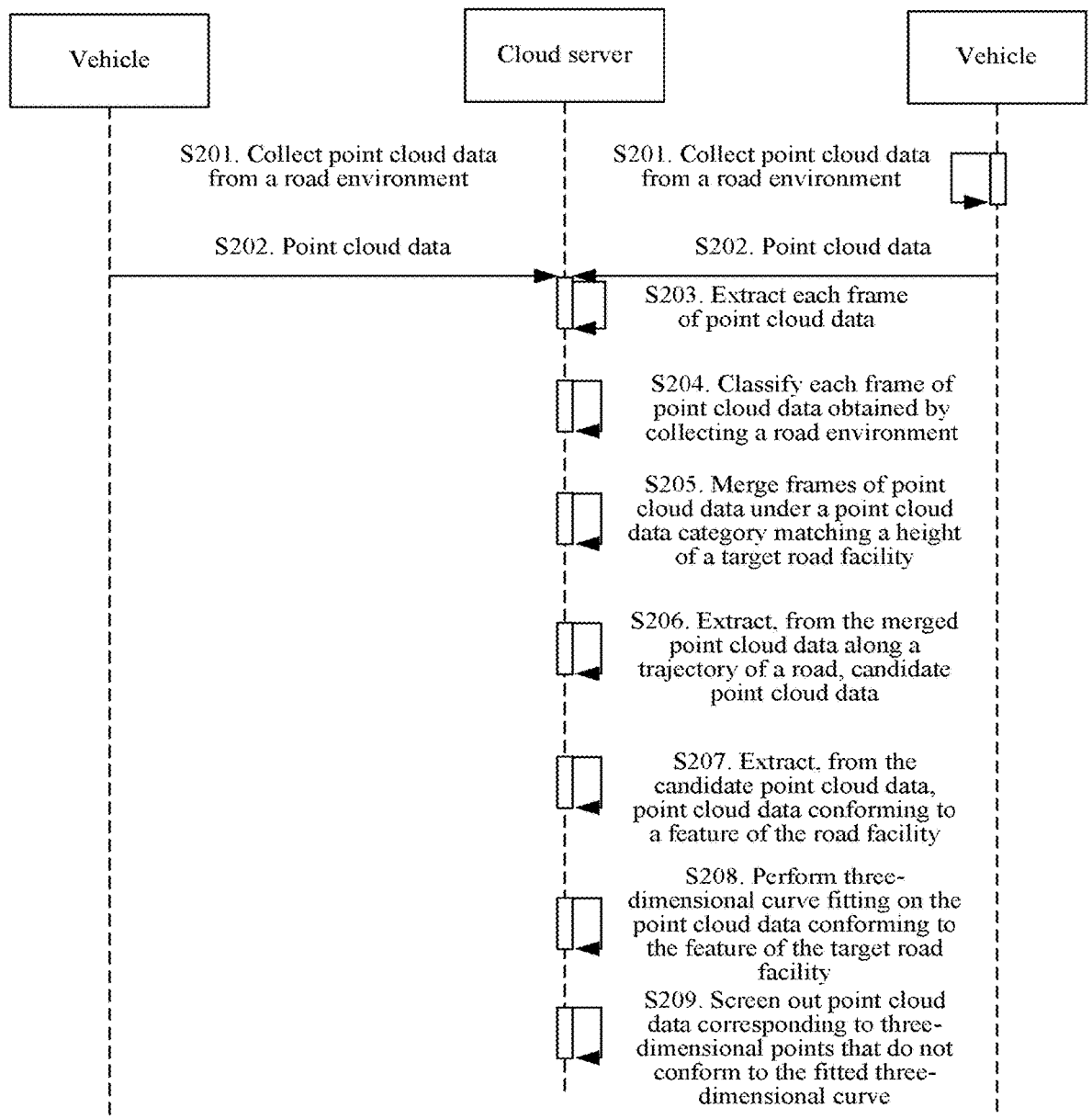
FIG. 4B is a schematic flow chart of a method for processing point cloud data according to an embodiment of the present disclosure.
Figure 4C:
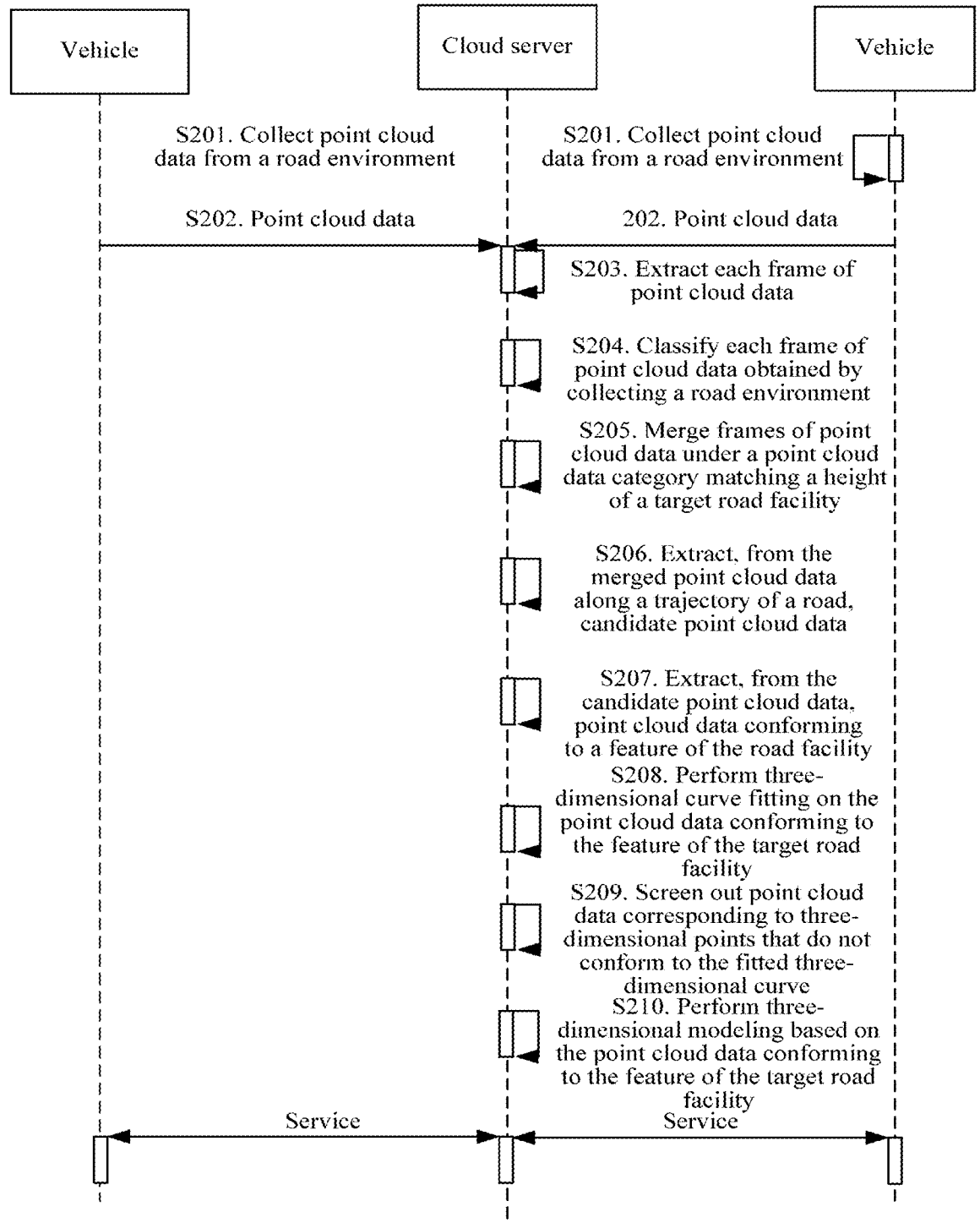
FIG. 4C is a schematic flow chart of a method for processing point cloud data according to an embodiment of the present disclosure.
Figure 4D:
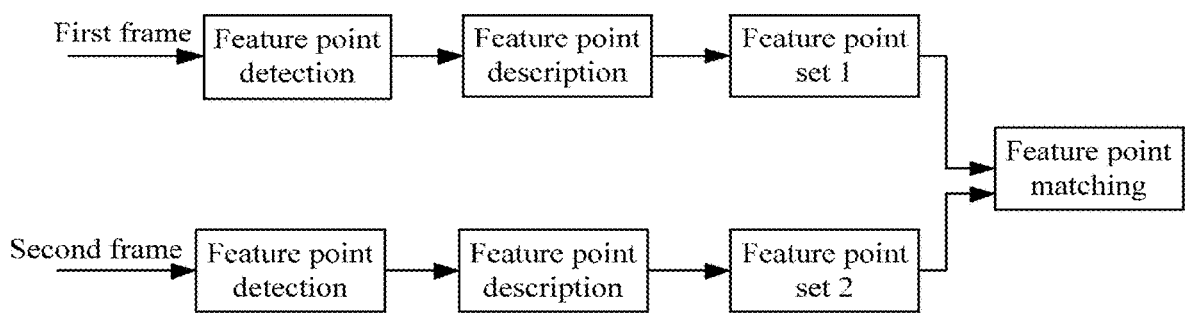
FIG. 4D is a schematic diagram of processing of merging point cloud data according to an embodiment of the present disclosure.
Figure 4E:
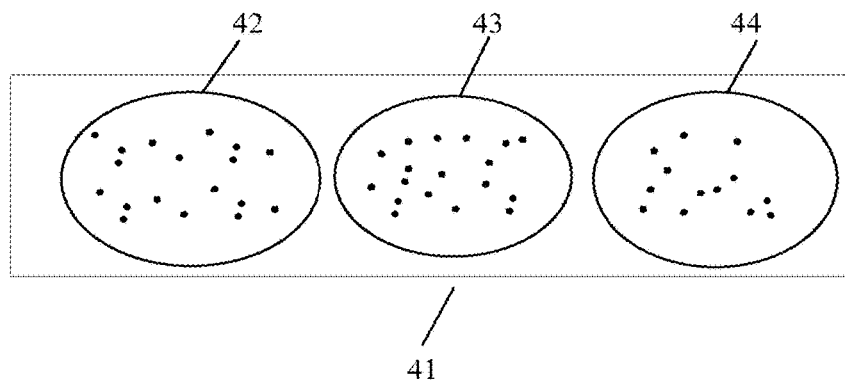
FIG. 4E is a schematic diagram of implementing of clustering a candidate point cloud data set according to an embodiment of the present disclosure.

For example, FIG. 4E is a schematic diagram of clustering a candidate point cloud data 41. According to a Euclidean distance approximation principle, three-dimensional points that are close in distance in a three-dimensional space are clustered as a candidate point cloud data set 42, a candidate point cloud data set 43, and a candidate point cloud data set 44.

Alternatively, point cloud data may be clustered with reference to a feature approximation principle. For example, when distances between three-dimensional points are not of sparseness, three-dimensional points of an approximated feature are clustered as a candidate point cloud data set based on an approximation degree of colors and an approximation degree of elevations (rectilinear projection distances to a reference plane).

Subsequently, a foregoing candidate point cloud data set is (uniformly or nonuniformly) segmented along a trajectory of a road. A spatial distribution feature of respective segment of the candidate point cloud data set is calculated. For example, the spatial distribution density of three-dimensional points in the segment of the candidate point cloud data set along different directions, and the spatial projection density of the three-dimensional points in the segment of the candidate point cloud data set along different directions can be identified. It can then be determined whether a candidate point cloud data set belongs to the point cloud data of the road facility based on the spatial distribution feature of each segment of the candidate point cloud data set.

Figure 4F:
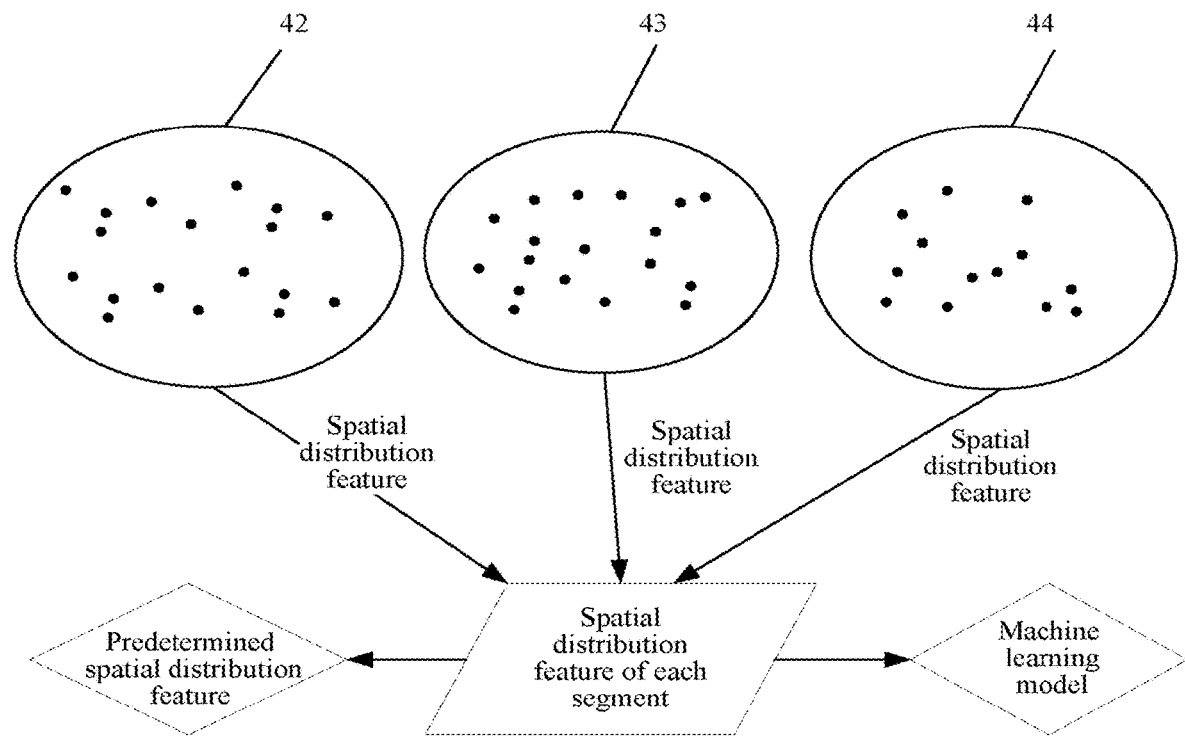
FIG. 4F is a schematic diagram of processing of determining whether a segmented candidate point cloud data set is point cloud data of a road facility according to an embodiment of the present disclosure.

Exemplarily, based on a spatial distribution feature of each segmented candidate point cloud data sets, whether the candidate point cloud data set belongs to the point cloud data of the road facility can be determined using the following methods:

1) Determination based on a predetermined spatial distribution feature of the point cloud data of the road facility With reference to FIG. 4E, and FIG. 4F, a candidate point cloud data set is divided into a plurality of segments, and a feature value of spatial distribution features of the plurality of segments are determined whether to conform to a predetermined spatial distribution feature of the point cloud data of the road facility, for example, whether to conform to a predetermined feature value of the point cloud data of the road facility, or be within a predetermined value range. For example, if at least half of the segments conform to predetermined spatial distribution feature of the point cloud data of the road facility, the candidate point cloud data set is determined to be the point cloud data of the road facility.

2) determination based on a machine learning model

Exemplarily, the machine learning model is obtained by using the following method:

2.1) Constructing a training sample: constructing the training sample (a spatial distribution feature, is/is not the point cloud data of the road facility) by using a spatial distribution feature of prior point cloud data and a result of whether the prior point cloud data is the point cloud data of the road facility.

2.2) Training a classifier in the machine learning model, to enable the machine learning model to have performance of determining whether point cloud data is the point cloud data of the road facility based on a spatial distribution feature of the point cloud data.

After the trained machine learning model is obtained, the spatial distribution feature of each segments of the candidate point cloud data set is input into the machine learning model, thereby obtaining a corresponding result whether the candidate point cloud data set is the point cloud data of the road facility.

In an embodiment, regarding the foregoing methods of extracting the point cloud data of the road facility from the candidate point cloud data set based on a whole distribution feature and a partial/local spatial distribution feature of the point cloud data of the road facility, one of the methods may be used alone, or both are used concurrently or simultaneously. In an embodiment where the methods are simultaneously used, extracting the point cloud data of the road facility from candidate point cloud data while ensuring a whole/general feature and a partial/local feature of the road facility can improve extraction accuracy and reduce the risk of incorrect or unwanted deletion or exclusion.

FIG. 4B shows a schematic flow chart of a method for processing point cloud data that can further reduce noise in the extracted point cloud data of the road facility according to an embodiment. After step S207 of FIG. 4A, three-dimensional curve fitting may further be performed on the point cloud data conforming to the feature of the road facility (step S208). Point cloud data corresponding to three-dimensional points that do not conform to the fitted three-dimensional curve is screened out (step S209). As a result, obtaining point cloud data that can or may more accurately represent the road facility.

Figure 4G:
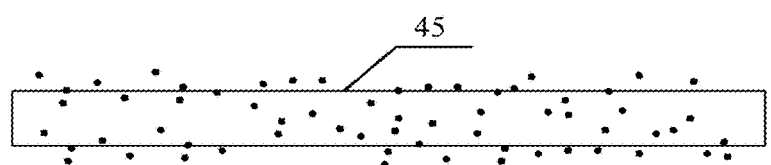
FIG. 4G is a schematic diagram of processing of performing three-dimensional curve fitting on point cloud data of a road according to an embodiment of the present disclosure.

For example, three-dimensional curve fitting is performed on point cloud data of a road shown in FIG. 4G to obtain a strip curve 45, and three-dimensional points located outside of a fitting curve in the point cloud data of the road facility are screened out as noise.

FIG. 4C shows a schematic flow chart of a method for processing point cloud data that includes additional steps after the point cloud data of the road facility is extracted according to an embodiment. After step S208 of FIG. 4B, three-dimensional modeling may further be performed based on the point cloud data conforming to the feature of the road facility, to form a three-dimensional entity image of the road facility (step S210). Through three-dimensional modeling, the discrete point cloud data is converted into the three-dimensional entity image of the road facility that can be presented or shown in a high-precision or suitable map.

For example, the high-precision or suitable map of the road facility may be employed in various applications, for example, in intelligent or driverless vehicles. The development of intelligent vehicles is becoming one of the largest areas of research and development for the automobile industry, and automated mapping is one of the core technologies needed to enable intelligent vehicles. For example, at least 90% of the technical innovation in the automotive industry in the future is likely to be concentrated on the field of intelligent vehicles. An automated driving or intelligent vehicle may be guided by a map with three-dimensional image or representation of road facility and dynamic traffic information along its path of travel. For example, data provided by e.g. the high-precision or suitable map and positioning data are utilized to determine the direction of travel and surrounding road conditions of a vehicle; and the dynamic traffic information may also be transmitted to a computing device (for example, a vehicle terminal) located on the vehicle (e.g. in real time) to provide information about traffic congestion, and enable selection of an optimal driving route.

A vehicle powered by electric energy also needs more efficient energy control and management. That is, the stored electrical power can only propel the vehicle for a certain distance before becoming depleted or requiring a recharge. In an embodiment, energy control is implemented with respect to or based on various static and/or dynamic traffic information provided by e.g. a high-precision or suitable map or other data sources. For example, it is determined whether traffic congestion exists ahead of the vehicle, and whether slope rise exists ahead, such that the electrical power utilization of a vehicle can be more accurately managed.

Based on an embodiment of where the road facility is a road guardrail, the following describes a process of extracting point cloud data of the road guardrail from the point cloud data collected using a vehicle laser scanner along a road.

In an embodiment, a rough classification is first performed on each frame of point cloud data to obtain ground point cloud data, short (low profile) object (corresponding to guardrails) point cloud data and other object point cloud data. Then, short object point cloud data of several frames are merged, and short object point cloud data that corresponds to the left and right sides of and that is most closest to a vehicle is acquired along a trajectory of travel, to obtain candidate point cloud data of the road guardrail; then spatial clustering is performed on the candidate point cloud data of the road guardrail to obtain each candidate point cloud data set of the road guardrail, a feature of each clustered point cloud data set is analyzed, and a point cloud data set of the guardrail is identified and an interference point cloud data set is deleted; and finally, three-dimensional curve fitting is performed on extracted point cloud data of the guardrail to obtain road guardrail data that can be finally represented in a high-precision or suitable map.

Figure 5A:
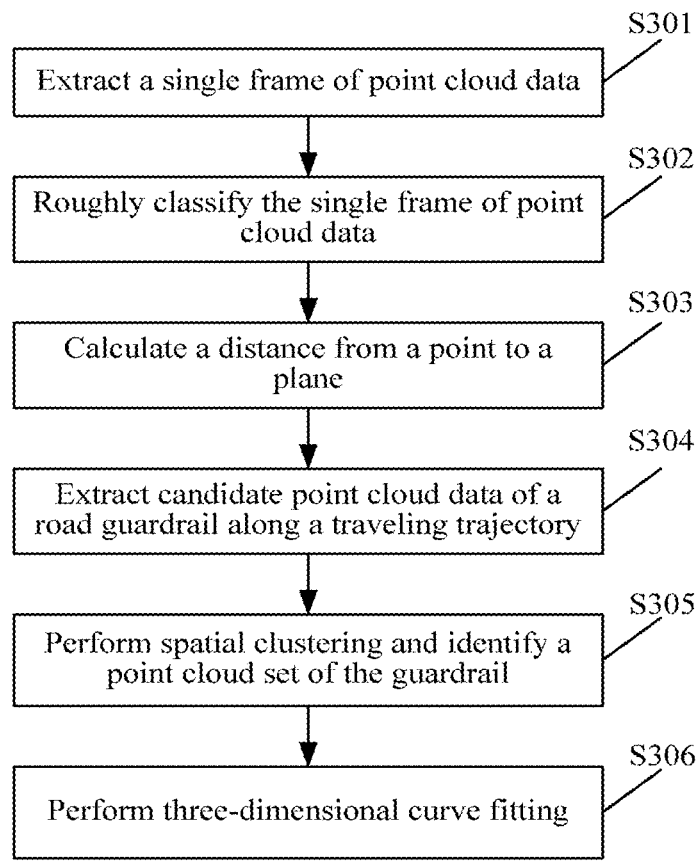
FIG. 5A is a schematic flow chart of extracting point cloud data of a road guardrail as shown in FIG. 5B from collected point cloud data according to an embodiment of the present disclosure.
Figure 5B:
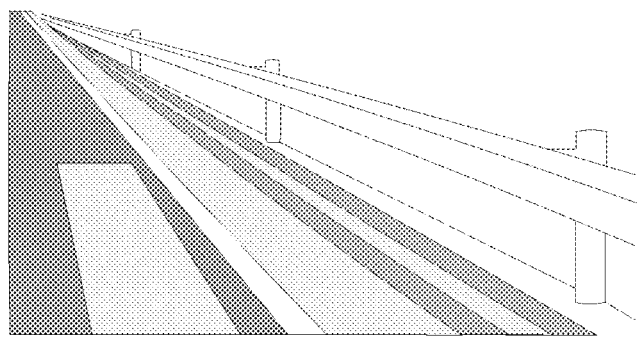
FIG. 5B is a schematic diagram of a road guardrail according to an embodiment of the present disclosure.

FIG. 5A shows a flow chart of an example process extracting a road guardrail shown in FIG. 5B. The process includes the following steps:

Step S301: Extract a single frame of point cloud data.

Figure 5C:
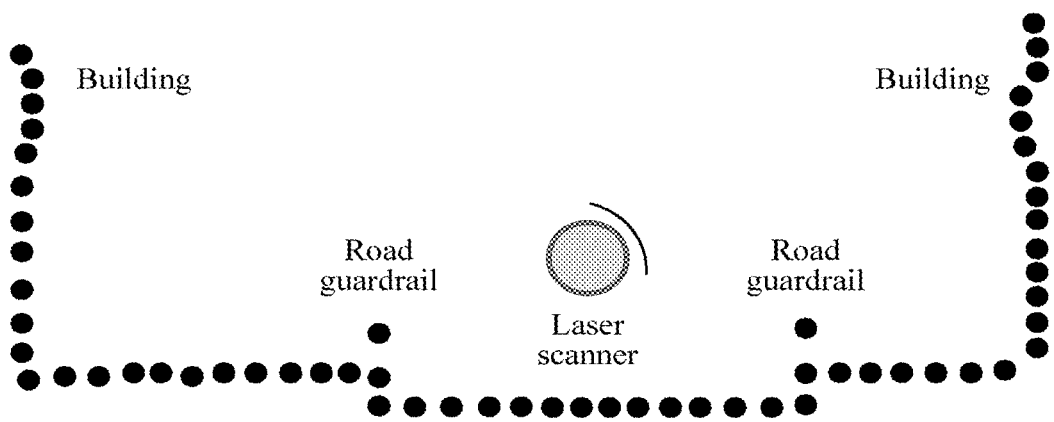
FIG. 5C is a schematic diagram of a scenario of using a laser scanner to scan a road environment to form point cloud data according to an embodiment of the present disclosure.

Because a laser scanner performs 360° rotational scanning, as shown in FIG. 5C, point cloud data obtained by rotational scanning from 0° to 360° using the laser scanner is referred to as a single frame of laser scanning line data (a single frame of point cloud data for short). During actual collection, each piece of laser scanning line data is continuously stored to form a point cloud data file in an embodiment. Therefore, after point cloud data is acquired, each frame of scanning line point cloud data needs to be extracted based on angle information of each point (that is, three-dimensional points whose angle values are between 0 to 360° are collected).

Step S302: Roughly classify the single frame of point cloud data.

For the single frame of point cloud data acquired in the previous step, a horizontal plane equation, such as, a*x+b*y+c*z+d=0, where c>0, is extracted by using a Ransac algorithm in an embodiment. Then, rough classification is performed on point cloud data based on a distance from each point in the single frame of point cloud data to a horizontal plane. In an embodiment, specific classification rules are as follows.

Step S303: Calculate a distance from a point to a plane, that is, dist=|a*x±b*y±c*z+d|/sqrt(a*a+b*b±c*c).

When dist<=dThred1, the point is determined as a ground point;

When dist>dThred1 and dist<=dThred2, the point is determined as a short object point; and When dist>dThred2, the point is determined as another point.

Herein, a value of dThred1 may be 0.3 m, and a value of dThred2 may be 1 m.

Step S304: Extract candidate point cloud data of a road guardrail along a trajectory of travel.

Figure 5D:
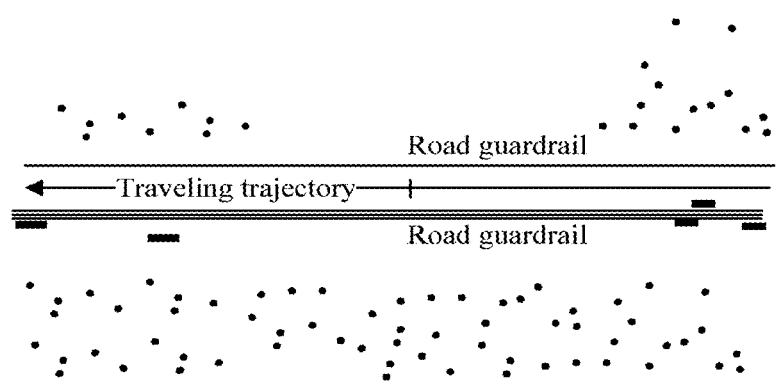
FIG. 5D is a schematic diagram of obtaining candidate point cloud data of a road guardrail by acquiring three-dimensional points on two sides of a vehicle and neighborhood points along a traveling trajectory according to an embodiment of the present disclosure.

In an embodiment, the points corresponding to a road guardrail may extend upward or vertically at least 40 cm from the ground, and falls within the points corresponding to a short object. When a neighboring lane is not shielded by a vehicle, the points of the road guardrail may be points closest to a collection vehicle. Accordingly, short object point cloud data in a plurality of frames of point cloud data is first accumulated to obtain a complete short object, as shown in FIG. 5D. Then, points closest to the left and right sides of the vehicle and their neighborhood points are respectively taken along the vehicle's trajectory, to obtain the candidate point cloud data of the road guardrail.

Step S305: Perform spatial clustering and identify a point cloud data set of the guardrail.

Spatial clustering is performed on the foregoing candidate point cloud data of the road guardrail to obtain a clustered point cloud data set of each candidate road guardrail. The clustering method that may be utilized includes, but is not limited to, a clustering method based on a Euclidean distance, a clustering method based on a graph theory, a clustering method based on a feature, and so on.

In an embodiment, a method for identifying the point cloud data set of the guardrail includes an identification method based on a whole distribution feature and an identification method based on a partial distribution feature.

In an embodiment, in the identification method based on the whole distribution feature, road guardrails may be represented by a continuous three-dimensional linear distribution. The road guardrails can be a smooth and continuous curve having similar elevations (e.g. distances to a ground projection) along a trajectory of a travel path. Based on such characteristics, the point cloud data set corresponding to the road guardrails can be quickly identified, and point cloud set corresponding to non-guardrail (for example, a vehicle on the ground, a crash cushion cylinder and plants on two sides of a road) may be deleted or ignored.

In an embodiment, in the identification method based on the partial/local feature, a candidate data set of the road guardrail is segmented along a trajectory of travel, a spatial distribution feature (which includes spatial distribution of point cloud in directions X, Y and Z and the point projection density in a vertical direction) of a point cloud data set in each segment is sequentially calculated; then a candidate point cloud data set of the road guardrail is identified by using a preset threshold (which may be artificially specified, or may be automatically acquired by using a supervised learning method); and finally the candidate point cloud data set of the road guardrail is evaluated to determine whether it represents real guardrail data by combining identification results of all segments.

In extractions of various embodiments, considering both whole and partial distribution features of guardrail point cloud data can improve extraction accuracy of the guardrail point cloud data, and reduce the risk of incorrect deletion.

Step S306: Perform three-dimensional curve fitting.

Figure 5E:
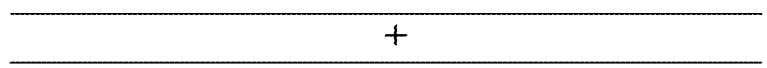
FIG. 5E is a schematic diagram of a three-dimensional curve of a road guardrail that is formed by fitting based on point cloud data of the road guardrail according to an embodiment of the present disclosure.

In an embodiment, a volume of the extracted guardrail point cloud data is still relatively large, and cannot be directly shown or represented in the high-precision map or map with a desired level of detail/resolution. In an embodiment, curve fitting is performed on the extracted guardrail point cloud data by using a three-dimensional curve fitting method, to obtain final three-dimensional curve data of the road guardrail, such as shown in FIG. 5E. Curve fitting method includes, but is not limited to, a polynomial equation-based least square three-dimensional curve fitting method, a Ransac based curve fitting method, and so on.

Based on exemplary examples and steps above, automatic extraction of road guardrail data based on vehicle captured point cloud data can be implemented, and high-precision or suitable/required road guardrail data can be obtained.

Figure 6:
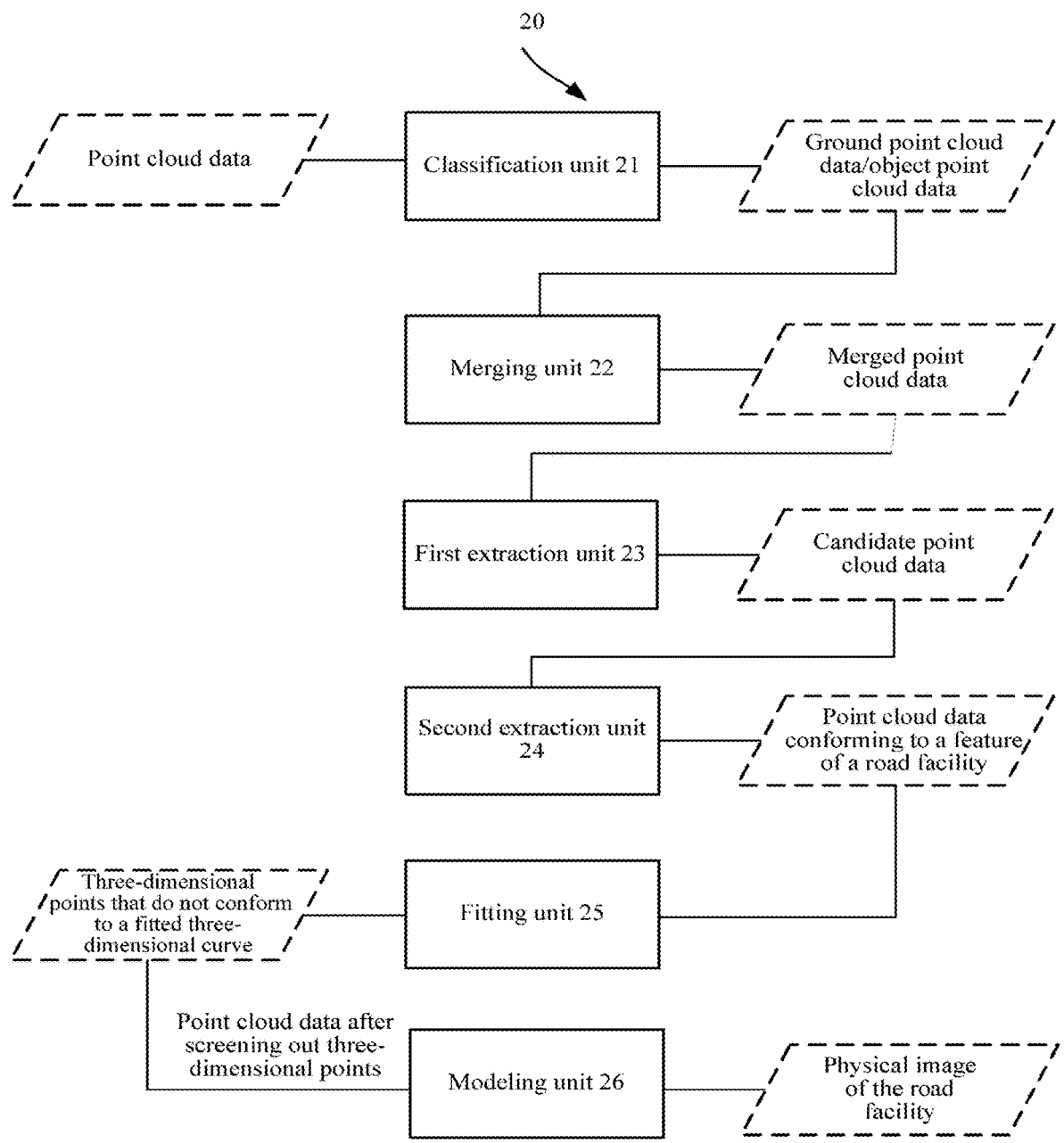
FIG. 6 is a schematic functional structural diagram of an apparatus for processing point cloud data according to an embodiment of the present disclosure.

A logical functional structure of the foregoing exemplary apparatus for processing point cloud data is described. Reference is made to a schematic diagram of a logical functional structure of an apparatus 20 for processing point cloud data shown in FIG. 6, which includes a classification unit 21, a merging unit 22, a first extraction unit 23, and a second extraction unit 24.

In an embodiment, the classification unit 21 is configured to classify, based on distances between three-dimensional points in point cloud data and a reference plane, each frame of point cloud data obtained from or based on a road environment; and extract each frame of point cloud data based on angle information of each point.

The point cloud data received by the classification unit 21 is discrete point cloud data collected at different positions relative to a vehicle and from different collection angles. The classification unit 21 integrates the received point cloud data in the form of a frame to facilitate subsequent processing. For example, for the received point cloud data, collection positions may be distinguished based on labels of geographic positions of the point cloud data. For point cloud data at each collection position, point cloud data from different collection angles of a corresponding position forms one frame of point cloud data of the corresponding position. Each frame of point cloud data includes coordinates and attribute information of three-dimensional points obtained by collecting the road environment from different angles at a corresponding position.

In an embodiment, the merging unit 22 is configured to merge frames of point cloud data under a point cloud data category which can be based on a predetermined/selected characteristic, such as the height of an object (e.g. road facility).

In an embodiment, the merging unit 22 is further configured to extract feature points of the frames of point cloud data under the point cloud data category; determine point cloud data having a same feature point in the frames of point cloud data; and stitch the point cloud data having the same feature point.

For merging of point cloud data, the merging unit 22 provides a method of stitching point cloud data based on feature points. Using the example where the road facility is a road guardrail, a plurality of frames of object point cloud data obtained from classification of each frame (or selected frames) of point cloud data may be merged. A feature is extracted from a coordinate(s) and attribute information of three-dimensional points of each frame (or selected frames) of object point cloud data, the same feature is obtained or identified by comparing each frame of point cloud data, and each frame (or selected frames) of point cloud data is stitched based on the same feature of/from each frame (or selected frames) of point cloud data.

In another embodiment, for merging of point cloud data, the merging unit 22 performs merging based on a three-dimensional conversion relationship between point sets of three-dimensional points in frames of point cloud data. A three-dimensional conversion relationship of a point set of same three-dimensional points between three-dimensional points in frames of point cloud data is identified, and the corresponding frames of point cloud data are stitched based on the three-dimensional conversion relationship.

In an embodiment, the first extraction unit 23 is configured to extract, from the merged point cloud data (e.g. along a trajectory of a road), candidate point cloud data having a distance to the road satisfies a predetermined condition.

In an embodiment, the first extraction unit 23 is further configured to identify three-dimensional points having distances to the road less than a first threshold distance, and/or three-dimensional points having distances to the identified three-dimensional points less than a second threshold distance, and acquire point cloud data corresponding to the identified three-dimensional points.

In an embodiment, the point cloud data may include geographic position information (along the path of travel or collection of such data). The geographic position information is extracted from each frame (or selected frames) of point cloud data to obtain a trajectory of the road which may be described or expressed in the form of adjacent geographic positions (for example, in the following format: a geographic position 1—a geographic position 2—a geographic position 3). For the point cloud data merged by the merging unit 22, the first extraction unit 23 may identify at least one of the following types of three-dimensional points along each geographic position (or selected geographic positions) in the trajectory of the road and from the merged point cloud data, and acquire point cloud data corresponding to the identified three-dimensional points as candidate point cloud data:

1) three-dimensional points closest to a corresponding geographic position in trajectory of the road, namely, three-dimensional points whose distances perpendicular from a surface of the road are less than a first threshold distance.

2) three-dimensional points (also referred to as neighborhood points) whose distances to the identified three-dimensional points (the three-dimensional points closest to the road) i are less than a second threshold distance (which may be the same as or different from the foregoing first threshold distance).

In an embodiment, the second extraction unit 24 is configured to extract, from the candidate point cloud data, point cloud data conforming to a feature of the road facility.

Exemplary method #1 of extracting point cloud data of a road facility by the second extraction unit 24:

In an embodiment, the second extraction unit 24 is further configured to identify, from the candidate point cloud data, three-dimensional points that are distributed along the trajectory of the road, and whose distances relative to the reference plane conform to a uniform condition; and extract point cloud data corresponding to the identified three-dimensional points.

In an embodiment, given that road facilities such as road guardrails, and traffic lights have a whole distribution feature of being uniformly disposed along a trajectory of a road and of certain consistent heights, correspondingly, the second extraction unit 24 provides a method of extracting point cloud data of a road facility, and identifies point cloud data satisfying the following conditions from the candidate point cloud data as the point cloud data of the road facility:

1) Three-dimensional points are distributed along the trajectory of the road, and distances perpendicular to a surface of the road are not beyond or greater than a predetermined threshold distance.

2) Rectilinear projection distances (also referred to an elevation) of three-dimensional points relative to a reference plane conform to a uniform feature.

Exemplary method #2 of extracting point cloud data of a road facility by the extraction unit 24:

In an embodiment, the second extraction unit 24 is further configured to perform clustering processing on the candidate point cloud data to form a candidate point cloud data set, and determine, based on a spatial distribution feature of candidate point cloud data set segmented along the trajectory of the road, each candidate point cloud data set corresponding to the target road facility.

In an embodiment, based on a partial spatial distribution feature of point cloud data of a road facility, when point cloud data conforming to a feature of the road facility is extracted from the candidate point cloud data, the second extraction unit 24 further performs extraction of the point cloud data of the road facility. The method includes: performing clustering processing on three-dimensional points in the candidate point cloud data to form a plurality of candidate point cloud data sets, each candidate point cloud data set including a plurality of three-dimensional points and attribute information; and determining, based on a spatial distribution feature of each segmented candidate point cloud data set, whether the candidate point cloud data set belongs to the point cloud data of the road facility.

In an embodiment, the classification unit 21 is further configured to determine the heights of three-dimensional points in each frame (or selected frames) of point cloud data relative to a horizontal plane, and define each frame (or selected frames) of point cloud data obtained from a road environment as at least ground point cloud data and object point cloud data.

In an embodiment, the reference plane may be a horizontal plane or another reference plane. A plane equation of a corresponding horizontal plane is established based on coordinates of three-dimensional points of each frame (or selected frames) of point cloud data, the classification unit 21 obtains the height of each three-dimensional point in the frame of the point cloud data relative to the horizontal plane and the value range of the heights corresponding to a ground and an object based on the plane equation, and defines each frame (or selected frames) of point cloud data as at least point cloud data corresponding to the ground (ground point cloud data) and point cloud data corresponding to the object (object point cloud data). Certainly, each frame (or selected frames) of point cloud data may also be defined as point cloud data of another type or category such a type or category having a higher or different height than the height of the object (another point cloud data for short).

In an embodiment, the apparatus 20 for processing point cloud data further includes:

a fitting unit 25, configured to perform three-dimensional curve fitting on the point cloud data that is extracted by the second extraction unit 24 and that conforms to the feature of the road facility, and screen out point cloud data corresponding to three-dimensional points that do not conform to the fitted three-dimensional curve, to further reduce noise in the extracted point cloud data of the road facility.

In an embodiment, the apparatus 20 for processing point cloud data further includes:

a modeling unit 26, configured to perform three-dimensional modeling based on the point cloud data conforming to the feature of the road facility, to form a three-dimensional entity image of the road facility that can be configured to be presented or shown in a high-precision or suitable map.

An exemplary apparatus for processing collected point cloud data is discussed in the foregoing embodiment. In an embodiment, the foregoing processing may be allocated to or completed by different program modules as programmed or required, that is, the internal structure of the apparatus may be subdivided into different or various program modules, to complete all or some of the foregoing described processing. In addition, the apparatus for processing data provided in the foregoing embodiments relates to the concept of the described embodiments of the data processing methods.

An embodiment of the present disclosure provides an apparatus for processing point cloud data, including a processor and a storage medium e.g. for storing executable instructions used to instruct or command the processor to perform the following operations:

classifying, based on distances between three-dimensional points in point cloud data and a reference plane, each frame (or selected frames) of point cloud data obtained e.g. from a road environment;

merging frames of point cloud data under a point cloud data category matching e.g. a height of a road facility;

extracting, from the merged point cloud data along a trajectory of a road, candidate point cloud data whose distance to the road satisfies a predetermined condition; and extracting, from the candidate point cloud data, point cloud data conforming to a feature of the road facility.

In an embodiment, the classifying, based on distances between three-dimensional points in point cloud data and a reference plane, each frame (or selected frames) of point cloud data obtained from a road environment includes:

determining different distances of three-dimensional points in each frame (or selected frames) of point cloud data relative to a horizontal plane; and defining each frame (or selected frames) of point cloud data obtained from the road environment as at least ground point cloud data and object point cloud data.

In an embodiment, the processor further performs the following operations:

extracting feature points of the frames of point cloud data under the point cloud data category, and stitching the frames of point cloud data based on the same feature point in the frames of point cloud data; and/or identifying a three-dimensional transformation relationship of the same three-dimensional point between frames of point cloud data, and stitching the corresponding frames of point cloud data based on the three-dimensional transformation relationship.

In an embodiment, the processor further performs the following operations:

identifying, from the merged point cloud data along a trajectory of a road, three-dimensional points whose distances to the road are less than a first threshold distance, and/or three-dimensional points whose distances to the three-dimensional points are less than a second threshold distance, and acquiring point cloud data corresponding to the identified three-dimensional points.

In an embodiment, the processor further performs the following operations:

identifying, from the candidate point cloud data, three-dimensional points that are distributed along the trajectory of the road, and whose rectilinear projection distances relative to the reference plane conform to a uniform feature, and extracting point cloud data corresponding to the identified three-dimensional points; and/or performing clustering processing on the candidate point cloud data to form a candidate point cloud data set, segmenting the point cloud data set along the trajectory of the road, and determining, based on a spatial distribution feature of the segmented candidate point cloud data set, each candidate point cloud data set corresponding to the target road facility.

In an embodiment, the processor further performs the following operations:

performing three-dimensional curve fitting on the point cloud data conforming to the feature of the road facility, and screening out point cloud data corresponding to three-dimensional points that do not conform to the fitted three-dimensional curve.

In an embodiment, the processor further performs the following operations:

performing three-dimensional modeling based on the point cloud data conforming to the feature of the road facility, to form a three-dimensional entity image or representation of the road facility.

An embodiment of the present disclosure provides a storage medium, storing an executable instruction, used for performing the method for processing point cloud data provided in the embodiments of the present disclosure, for example, the method for processing point cloud data shown in any of the accompanying drawings, e.g. FIG. 1, FIG. 4A to 4-3, and FIG. 5A. The storage medium includes a non-transitory computer-readable storage medium such as a volatile random access memory (RAM), a read-only memory (ROM), an electrically erasable programmable read-only memory (EEPROM), a flash memory or another memory technology, a compact disc read-only memory (CD-ROM), a digital versatile disc (DVD) or another accessed medium.

A person skilled in the art may understand that some or all of the steps for implementing the method embodiments may be implemented using hardware incorporating suitable program instructions. The program may be stored in a computer readable storage medium. When the program is executed, the steps including the method embodiments are performed. Storage medium may include various types of media suitable for storing program code, for example, but not limited to, a mobile storage device, a random access memory (RAM), a read-only memory (ROM), a magnetic disk, or an optical disk.

Alternatively, in an embodiment, when the integrated unit of the present disclosure is implemented in a form of a software functional module and sold or used as an independent product, the integrated unit may be stored in a computer-readable storage medium. Based on such an understanding, the technical solutions of the embodiments of the present disclosure, or a part thereof may be implemented in the form of a software product. The computer software product may be stored in a storage medium and may include instructions or code for instructing a computer device (which may be a personal computer, a server, a network device, or the like) to perform all or some of the methods described in the embodiments of the present disclosure.

The foregoing descriptions provide exemplary implementations or embodiments of the present disclosure, and are not intended to limit the scope of the present disclosure and appended claims.

INDUSTRIAL PRACTICABILITY

The embodiments of the present disclosure provide the following technical effects:

1) initial classification is performed on a selected or desired frame of point cloud data to quickly/rapidly position a candidate point cloud data set where a road object, such as a guardrail, is located or corresponding to such object; this can greatly reduce data volume/size in subsequent processing and improve processing efficiency;

2) a technical feature of using a plurality of frames of point cloud data to extract and identify data corresponding to a road object is that this approach is more robust than that of using a single frame of point cloud data to extract or identify data corresponding to a road object, and 3) in the embodiment relating to the identification of road guardrails, based on the characteristics that the road guardrails have a continuous three-dimensional linear spatial distribution, point cloud data clustering is first performed before the identification operation. Under such a configuration, non-guardrail point cloud data can be removed through the clustering operation and identification accuracy and efficiency of point cloud data of the road guardrails can thus be improved.

What is claimed is:

1. A method for processing point cloud data, comprising:
classifying, by processing circuitry at an information processing apparatus, a plurality of frames of the point cloud data collected from an environment surrounding a pathway into categories based on distances between three-dimensional points of respective frames of the point cloud data and a reference plane of the respective frame of the point cloud data, the distances indicating heights of the three-dimensional points of the plurality of frames of the point cloud data;
merging, by the processing circuitry at the information processing apparatus, the frames of the point cloud data of a same one of the categories that matches a pathway object;
extracting, by the processing circuitry at the information processing apparatus, from the merged frames of the point cloud data, candidate point cloud data of three-dimensional points having distances from the pathway that satisfy a predetermined condition; and
extracting, by the processing circuitry at the information processing apparatus, from the candidate point cloud data, point cloud data conforming to a feature of the pathway object.

2. The method according to claim 1, further comprising:
determining different heights of the three-dimensional points in respective frames of the point cloud data relative to the reference plane of the respective frame; and
classifying, based on the determined heights, the plurality of frames of the point cloud data into at least ground point cloud data corresponding to a ground plane and object point cloud data corresponding to objects including pathway facilities.

3. The method according to claim 1, further comprising:
extracting feature points of the point cloud data of the same category in a first and second frame of the frames;
determining a same feature point of the point cloud data of the same category in the first and second frame; and
stitching together the point cloud data of the same category in the first and second frame based on the same feature point.

4. The method according to claim 1, further comprising:
identifying a three-dimensional transformation relationship of a first and second set of the three-dimensional points in the point cloud data of the same category and of a first and second frame, the first and second set of the three dimensional points corresponding to the first and second frame, respectively; and
stitching together the point cloud data of the same category and of the first and second frame based on the three-dimensional transformation relationship.

5. The method according to claim 1, further comprising:
identifying, from the merged frames of the point cloud data, first three-dimensional points having distances to the pathway less than a first distance threshold, and/or second three-dimensional points having distances to the first three-dimensional points less than a second distance threshold, and
determining the point cloud data corresponding to the identified first and/or second three-dimensional points as the candidate point cloud data.

6. The method according to claim 1, further comprising:
identifying, from the candidate point cloud data, the three-dimensional points that are distributed along the pathway, have distances to the pathway not exceeding a distance threshold, and have uniform heights;
extracting the point cloud data corresponding to the identified three-dimensional points; and
determining the extracted point cloud data as the point cloud data conforming to the feature of the pathway object.

7. The method according to claim 1, further comprising:
performing clustering processing on the three-dimensional points in the candidate point cloud data to form a candidate point cloud data set;
segmenting the candidate point cloud data set along the pathway into segmented data sets; and
determining, based on a spatial distribution feature of one of the segmented data sets, whether the candidate point cloud data set belongs to the point cloud data conforming to the feature of the target pathway object.

8. The method according to claim 1, further comprising:
performing three-dimensional curve fitting on the point cloud data conforming to the feature of the pathway object.

9. The method according to claim 1, further comprising:
performing three-dimensional modeling based on the point cloud data conforming to the feature of the pathway object, to form a three-dimensional entity image of the pathway object.

10. An apparatus for processing point cloud data, comprising circuitry configured to:
classify a plurality of frames of the point cloud data collected from an environment surrounding a pathway into categories based on distances between three-dimensional points of respective frames of the point cloud data and a reference plane of the respective frame of the point cloud data, the distances indicating heights of the three-dimensional points of the plurality of frames of the point cloud data;
merge the frames of the point cloud data of a same one of the categories that matches a pathway object;
extract, from the merged frames of the point cloud data, candidate point cloud data of three-dimensional points having distances from the pathway that satisfy a predetermined condition; and
extract, from the candidate point cloud data, point cloud data conforming to a feature of the pathway object.

11. The apparatus according to claim 10, wherein the circuitry is further configured to:
determine different heights of the three-dimensional points in respective frames of the point cloud data relative to the reference plane of the respective frame; and
classify, based on the determined heights, the plurality of frames of the point cloud data into at least ground point cloud data corresponding to a ground plane and object point cloud data corresponding to objects including pathway facilities.

12. The apparatus according to claim 10, wherein the circuitry is further configured to:
extract feature points of the point cloud data of the same category in a first and second frame of the frames;
determine a same feature point of the point cloud data of the same category in the first and second frame; and
stitch together the point cloud data of the same category in the first and second frame based on the same feature point.

13. The apparatus according to claim 10, wherein the circuitry is further configured to:
identify a three-dimensional transformation relationship of a first and second set of the three-dimensional points in the point cloud data of the same category and of a first and second frame, the first and second set of the three dimensional points corresponding to the first and second frame, respectively; and
stitch together the point cloud data of the same category and of the first and second frame based on the three-dimensional transformation relationship.

14. The apparatus according to claim 10, wherein the circuitry is further configured to:
identify, from the merged frames of the point cloud data, first three-dimensional points having distances to the pathway less than a first distance threshold, and/or second three-dimensional points having distances to the first three-dimensional points less than a second distance threshold, and
determine the point cloud data corresponding to the identified first and/or second three-dimensional points as the candidate point cloud data.

15. The apparatus according to claim 10, wherein the circuitry is further configured to:
identify, from the candidate point cloud data, the three-dimensional points that are distributed along the pathway, have distances to the pathway not exceeding a distance threshold, and have uniform heights;
extract the point cloud data corresponding to the identified three-dimensional points; and
determine the extracted point cloud data as the point cloud data conforming to the feature of the pathway object.

16. The apparatus according to claim 10, wherein the circuitry is further configured to:
perform clustering processing on the three-dimensional points in the candidate point cloud data to form a candidate point cloud data set;
segment the candidate point cloud data set along the pathway into segmented data sets; and
determine, based on a spatial distribution feature of one of the segmented data sets, whether the candidate point cloud data set belongs to the point cloud data conforming to the feature of the target pathway object.

17. The apparatus according to claim 10, wherein the circuitry is further configured to:
perform three-dimensional curve fitting on the point cloud data conforming to the feature of the pathway object.

18. The apparatus according to claim 10, wherein the circuitry is further configured to:
perform three-dimensional modeling based on the point cloud data conforming to the feature of the pathway object, to form a three-dimensional entity image of the pathway object.

19. A non-transitory computer-readable medium storing a program executable by a processor to perform:
- classifying a plurality of frames of the point cloud data collected from an environment surrounding a pathway into categories based on distances between three-dimensional points of respective frames of the point cloud data and a reference plane of the respective frame of the point cloud data, the distances indicating heights of the three-dimensional points of the plurality of frames of the point cloud data;
- merging the frames of the point cloud data of a same one of the categories that matches a pathway object;
- extracting from the merged frames of the point cloud data, candidate point cloud data of three-dimensional points having distances from the pathway that satisfy a predetermined condition; and
- extracting from the candidate point cloud data, point cloud data conforming to a feature of the pathway object.

20. The non-transitory computer-readable medium according to claim 19, wherein the program is executable by the processor to further perform:
- determining different heights of the three-dimensional points in respective frames of the point cloud data relative to the reference plane of the respective frame; and
- classifying, based on the determined heights, the plurality of frames of the point cloud data into at least ground point cloud data corresponding to a ground plane and object point cloud data corresponding to objects including pathway facilities.

* * * * *